United States Patent
Chae et al.

(10) Patent No.: US 9,608,790 B2
(45) Date of Patent: *Mar. 28, 2017

(54) METHOD AND APPARATUS FOR TRANSMITTING RECEIPT ACKNOWLEDGEMENT IN WIRELESS COMMUNICATION SYSTEM

(71) Applicant: LG ELECTRONICS INC., Seoul (KR)

(72) Inventors: Hyukjin Chae, Seoul (KR); Dongyoun Seo, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,692

(22) Filed: Apr. 6, 2015

(65) Prior Publication Data

US 2015/0215081 A1 Jul. 30, 2015

Related U.S. Application Data

(63) Continuation of application No. 14/431,024, filed as application No. PCT/KR2014/000884 on Jan. 29, 2014.

(Continued)

(51) Int. Cl.
*H04W 72/04* (2009.01)
*H04L 5/00* (2006.01)
(Continued)

(52) U.S. Cl.
CPC .......... *H04L 5/0055* (2013.01); *H04L 1/1621* (2013.01); *H04L 1/1854* (2013.01);
(Continued)

(58) Field of Classification Search
CPC ........... H04W 72/042; H04W 72/0406; H04W 72/04; H04W 72/0446; H04W 80/04;
(Continued)

(56) References Cited

U.S. PATENT DOCUMENTS

2013/0242817 A1 9/2013 He et al.
2013/0242882 A1 9/2013 Blankenship et al.
(Continued)

FOREIGN PATENT DOCUMENTS

WO 2014/109873 7/2014

OTHER PUBLICATIONS

LG Electronics, et al., "Way Forward on ARO values for TDD-EPDCCH," 3GPP TSG RAN WG1 #72, R1-130738, Jan. 2013, 3 pages.

(Continued)

*Primary Examiner* — Andrew Lee
(74) *Attorney, Agent, or Firm* — Lee Hong Degerman Kang Waimey

(57) ABSTRACT

The present invention discloses a method for transmitting a reception acknowledgement response in a wireless communication system. The method includes receiving an enhanced physical downlink control channel (EPDCCH), determining a physical uplink control channel (PUCCH) resource based on a lowest one of enhanced control channel element (ECCE) indexes configuring the EPDCCH and a HARQ-ACK resource offset (ARO), and transmitting a reception acknowledgement response through the PUCCH resource. When a reception acknowledgement response related to two or more subframes is transmitted in a subframe for transmission of the reception acknowledgement response, a set of possible values for the ARO includes a first ARO value to shift a PUCCH resource of a specific subframe to a PUCCH resource region for at least one subframe prior to the specific (Continued)

subframe. The first ARO value provides a different shift amount depending on a group having the specific subframe among groups related to the two or more subframes.

8 Claims, 12 Drawing Sheets

Related U.S. Application Data

(60) Provisional application No. 61/758,766, filed on Jan. 31, 2013, provisional application No. 61/759,382, filed on Jan. 31, 2013.

(51) Int. Cl.
  *H04L 1/16* (2006.01)
  *H04L 1/18* (2006.01)

(52) U.S. Cl.
  CPC ......... *H04L 1/1861* (2013.01); *H04W 72/042* (2013.01); *H04W 72/0413* (2013.01); *H04W 72/0453* (2013.01); *H04L 1/1864* (2013.01)

(58) Field of Classification Search
  CPC ..... H04W 88/06; H04J 3/0685; H04J 3/0664; H04J 3/0608
  See application file for complete search history.

(56) References Cited

U.S. PATENT DOCUMENTS

| | | |
|---|---|---|
| 2013/0242890 A1 | 9/2013 | He et al. |
| 2014/0036803 A1 | 2/2014 | Park |
| 2014/0112260 A1 | 4/2014 | Sorrentino |
| 2014/0192730 A1 | 7/2014 | Seo et al. |
| 2014/0301290 A1 | 10/2014 | He et al. |
| 2014/0348077 A1 | 11/2014 | Chen et al. |
| 2015/0016311 A1 | 1/2015 | Han et al. |
| 2015/0110022 A1 | 4/2015 | Liu et al. |
| 2015/0131579 A1 | 5/2015 | Li et al. |
| 2015/0181588 A1 | 6/2015 | Song et al. |
| 2016/0066302 A1 | 3/2016 | Han et al. |

OTHER PUBLICATIONS

Nokia Siemens Networks, et al., "Remaining issues on TDD HARQ-ACK resource allocation for data scheduled via EPDCCH," 3GPP TSG-RAN WG1 Meeting #72, R1-130475, Jan. 2013, 5 pages.
Ericsson, ST-Ericsson, "Remaining details of PUCCH resource allocation for EPDCCH," 3GPP TSG-RAN WG1 #71, RI-124896, Nov. 2012, 5 pages.
Ericsson, ST-Ericsson, "PUCCH resource allocation for ePDCCH," 3GPP TSG-RAN WG1 Meeting #70bis, R1-124156, Oct. 2012, 5 pages.
LG Electronics, "PUCCH A/N resource allocation for EPDCCH," 3GPP TSG-RAN WG1 Meeting #71, R1-125241, Nov. 2012, 7 pages.
Catt, "PUCCH resource for E-PDCCH," 3GPP TSG-RAN WG1 Meeting #71, R1-125233, Nov. 2012, 9 pages.
Ericsson, ST-Ericsson, "DCI formats supported on ePDCCH," 3GPP TSG-RAN WG1 Meeting #71, R1-124897, Nov. 2012, 3 pages.
U.S. Appl. No. 14/431,024, Notice of Allowance dated Mar. 21, 2016, 15 pages.
European Patent Office Application Serial No. 147456693, Search Report dated Aug. 19, 2016, 9 pages.
Interl Corporation, "Remaining details on PUCCH resource allocation for EPDCCH", R1-130074, 3GPP TSG-RAN WG1 #72, Feb. 2013, 4 pages.

FIG. 9
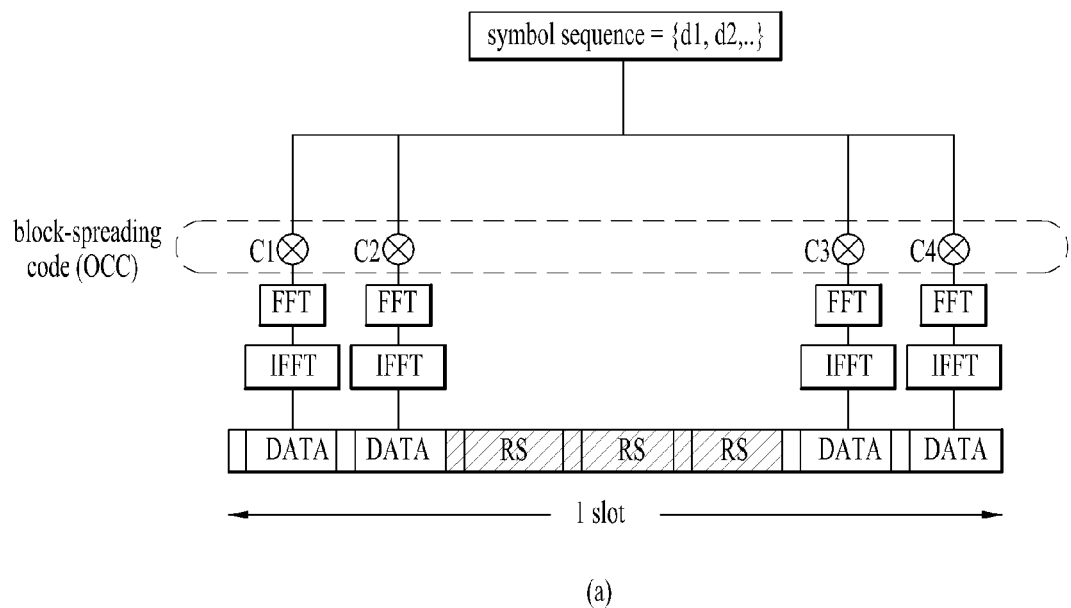
(a)
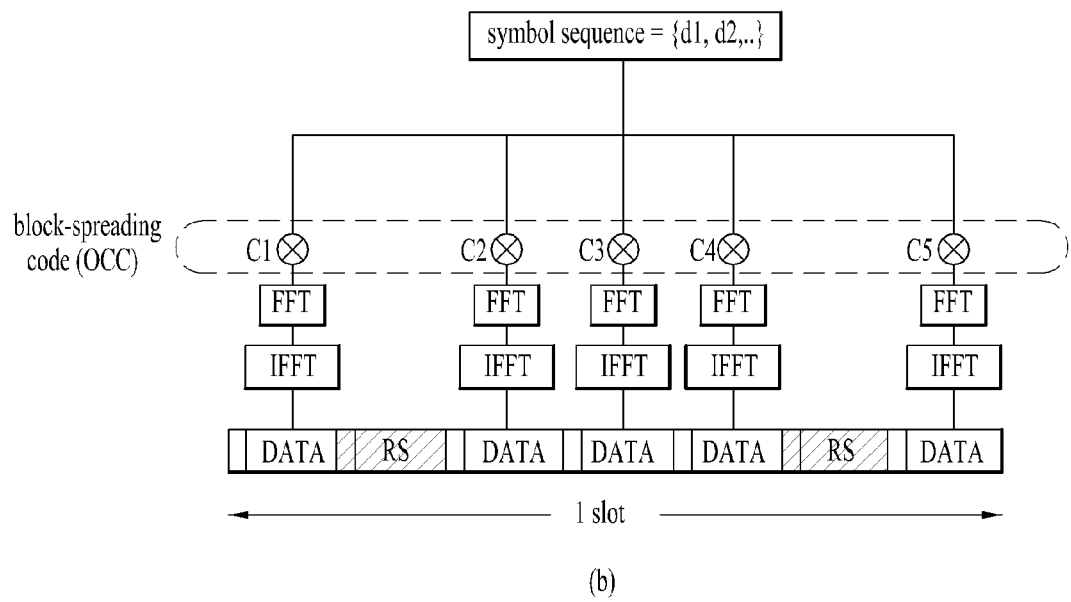
(b)

FIG. 12

| $N_{ECCE,0,j}$ | $N_{ECCE,1,j}$ | $N_{ECCE,2,j}$ | $N_{ECCE,3,j}$ | $N_{ECCE,4,j}$ | $N_{ECCE,5,j}$ | $N_{ECCE,6,j}$ | $N_{ECCE,7,j}$ | $N_{ECCE,8,j}$ |
|---|---|---|---|---|---|---|---|---|
| m=0 | m=1 | m=2 | m=3 | m=4 | m=5 | m=6 | m=7 | m=8 |

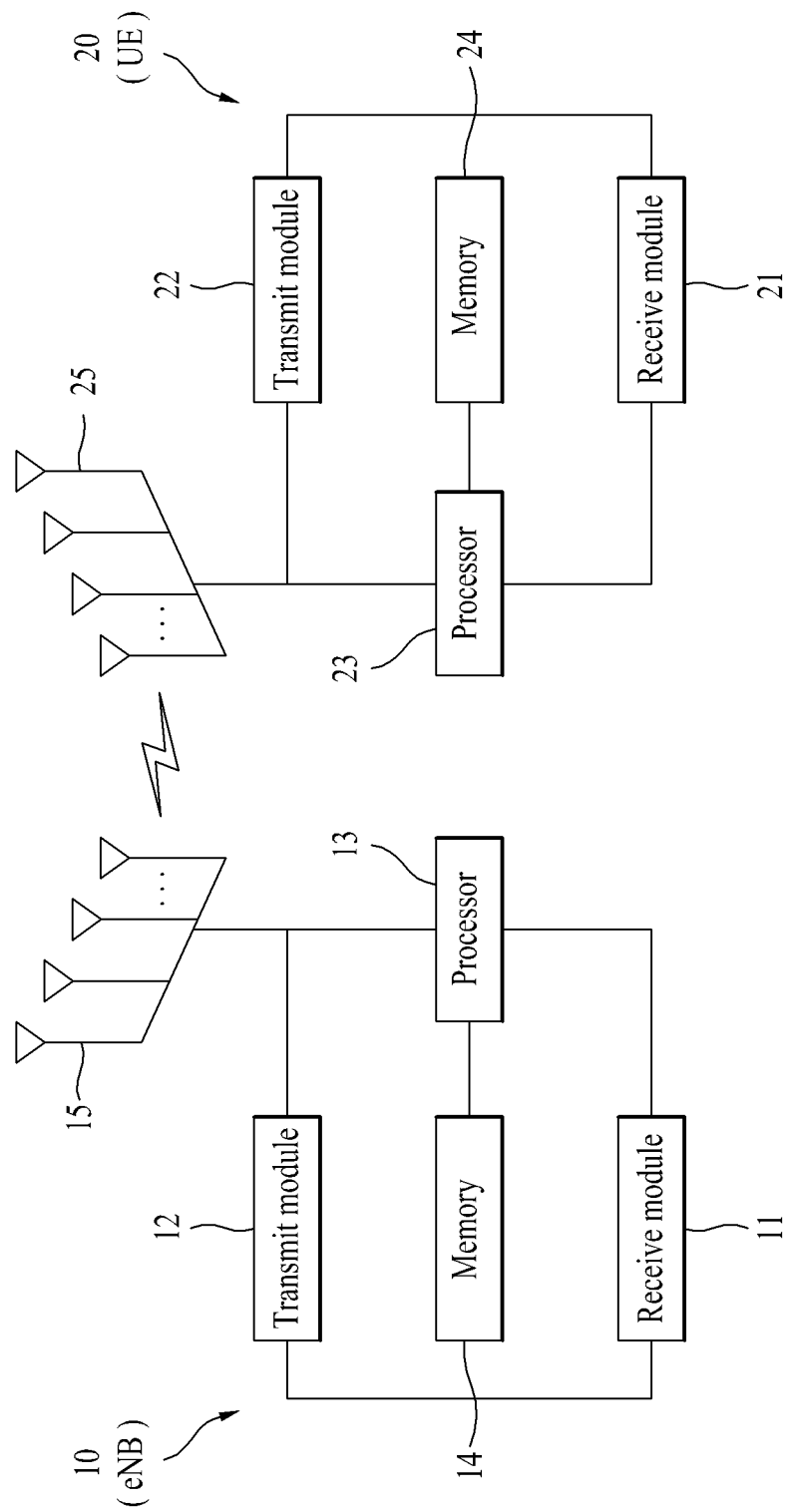

METHOD AND APPARATUS FOR TRANSMITTING RECEIPT ACKNOWLEDGEMENT IN WIRELESS COMMUNICATION SYSTEM

CROSS-REFERENCE TO RELATED APPLICATIONS

This application is a continuation of U.S. application Ser. No. 14/431,024, filed on Mar. 25, 2015, now U.S. Pat. No. 9,401,795, which is the National Stage filing under 35 U.S.C. 371 of International Application No. PCT/KR2014/000884, filed on Jan. 29, 2014, which claims the benefit of U.S. Provisional Application Nos. 61/758,766, filed on Jan. 31, 2013, and 61/759,382, filed on Jan. 31, 2013, the contents of which are all hereby incorporated by reference herein in their entirety.

TECHNICAL FIELD

The present invention relates to a method and device for transmitting a reception acknowledgement response in a wireless communication system and, more particularly, to a method and device for transmitting reception acknowledgement in a wireless communication system using an enhanced physical downlink channel (EPDCCH).

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention devised to solve the problem lies in a method for transmitting reception acknowledgement upon receiving control information on an enhanced physical downlink channel (EPDCCH) in time division duplex (TDD).

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In a first aspect of the present invention, provided herein is a method for transmitting a reception acknowledgement response by a user equipment in a wireless communication system, including receiving an enhanced physical downlink control channel (EPDCCH), determining a physical uplink control channel (PUCCH) resource based on a lowest enhanced control channel element (ECCE) index of ECCE indexes constructing the EPDCCH and a HARQ-ACK resource offset (ARO), and transmitting a reception acknowledgement response through the PUCCH resource, wherein, when a reception acknowledgement responses related to two or more subframes are transmitted in a subframe for transmission of the reception acknowledgement response, a set of possible values for the ARO includes a first ARO value which shifts a PUCCH resource of a specific subframe to a PUCCH resource region for at least one subframe prior to the specific subframe, wherein the first ARO value provides a different shift amount depending on which group the specific subframe belongs to among groups related to the two or more subframes.

In a second aspect of the present invention, provided herein is a user equipment (UE) apparatus for transmitting a reception acknowledgement response in a wireless communication system, including a receive module and a processor, wherein the processor receives an enhanced physical downlink control channel (EPDCCH), determines a physical uplink control channel (PUCCH) resource based on a lowest enhanced control channel element (ECCE) index of ECCE indexes constructing the EPDCCH and a HARQ-ACK resource offset (ARO), and transmits a reception acknowledgement response through the PUCCH resource, wherein, when a reception acknowledgement responses related to two or more subframes are transmitted in a subframe for transmission of the reception acknowledgement response, a set of possible values for the ARO includes a first ARO value which shifts a PUCCH resource of a specific subframe to a PUCCH resource region for at least one subframe prior to the specific subframe, the first ARO value providing a different shift amount depending on which group the specific subframe belongs among groups related to the two or more subframes.

The first and second aspects of the present invention may include the following details.

When the two or more subframes include up to nine subframes, the groups may include a first group including a second subframe to a fourth subframe, a second group including a fifth subframe to a seventh subframe, and a third group including an eighth subframe and a ninth subframe.

The first ARO value may provide a shift amount of the number of ECCEs of a last preceding subframe+1 for a subframe corresponding to the first group, a shift amount of the number of ECCEs of last two preceding subframes+1 for a subframe corresponding to the second group, and a shift amount of the number of ECCEs of last three preceding subframes+1 for a subframe corresponding to the third group.

The first ARO value may be $$-\sum_{i=m-\lceil m/3 \rceil}^{m-1} N_{eCCE,i,j} - 1,$$

wherein m may be an index of two or more subframes, and $N_{eCCE,i,j}$ may be the number of ECCEs of an i-th subframe in EPDCCH-PRB-set j.

The set of possible values for the ARO may be $$\left\{ -\sum_{i=0}^{m-1} N_{eCCE,i,j} - 2, \; -\sum_{i=m-\lceil m/3 \rceil}^{m-1} N_{eCCE,i,j} - 1, \; 0, \; 2 \right\}.$$

When a reception acknowledgement response related to one subframe is transmitted in a subframe for transmission of the reception acknowledgement response, the set of possible values for the ARO may be {−2, −1, 0, 2}.

The ARO may be indicated by downlink control information (DCI), the DCI being transmitted over the EPDCCH.

In a third aspect of the present invention, provided herein is a method for transmitting a reception acknowledgement response by a user equipment in a wireless communication system, including receiving an enhanced physical downlink control channel (EPDCCH), determining a physical uplink control channel (PUCCH) resource based on a lowest enhanced control channel element (ECCE) index of ECCE indexes constructing the EPDCCH and a HARQ-ACK resource offset (ARO), and transmitting a reception acknowledgement response through the PUCCH resource, wherein, when a reception acknowledgement response related to two or more subframes is transmitted in a subframe for transmission of the reception acknowledgement response, a set of possible values for the ARO includes $$-\sum_{i=m-\lceil m/3 \rceil}^{m-1} N_{eCCE,i,j} - 1,$$

wherein m is an index of the two or more subframes, and $N_{eCCE, i, j}$ is the number of ECCEs of an i-th subframe in EPDCCH-PRB-set j.

In a fourth aspect of the present invention, provided herein is a user equipment (UE) apparatus for transmitting a reception acknowledgement response in a wireless communication system, including a receive module and a processor, wherein the processor receives an enhanced physical downlink control channel (EPDCCH), determines a physical uplink control channel (PUCCH) resource based on a lowest enhanced control channel element (ECCE) index of ECCE indexes constructing the EPDCCH and a HARQ-ACK resource offset (ARO), and transmits a reception acknowledgement response through the PUCCH resource, wherein, when a reception acknowledgement response related to two or more subframes is transmitted in a subframe for transmission of the reception acknowledgement response, a set of possible values for the ARO includes $$-\sum_{i=m-\lceil m/3 \rceil}^{m-1} N_{eCCE,i,j} - 1,$$

wherein $N_{eCCE, i, j}$ is the number of ECCEs of an i-th subframe in EPDCCH-PRB-set j.

The first and second aspects of the present invention may include the following details.

The set of possible values for the ARO may be $$\left\{ -\sum_{i=0}^{m-1} N_{eCCE,i,j} - 2, -\sum_{i=m-\lceil m/3 \rceil}^{m-1} N_{eCCE,i,j} - 1, 0, 2 \right\}.$$

When a reception acknowledgement response related to one subframe is transmitted in a subframe for transmission of the reception acknowledgement response, the set of possible values for the ARO may be {−2, −1, 0, 2}.

The ARO may be indicated by downlink control information (DCI), the DCI being transmitted over the EPDCCH.

Advantageous Effects

According to the present invention, both waste of physical uplink control channel (PUCCH) resources, which results from reservation of a PUCCH resource region for a number of DL subframes, and PUCCH resource collision, which may occur when a large offset having a negative value is used, may be avoided.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 9 illustrates a PUCCH channel using block spreading.

FIGS. 12 and 13 are diagrams illustrating HARQ-ACK resource offset (ARO) according to one embodiment of the present invention.

FIG. 14 is a diagram illustrating configuration of transceivers.

BEST MODE

Figure 1:
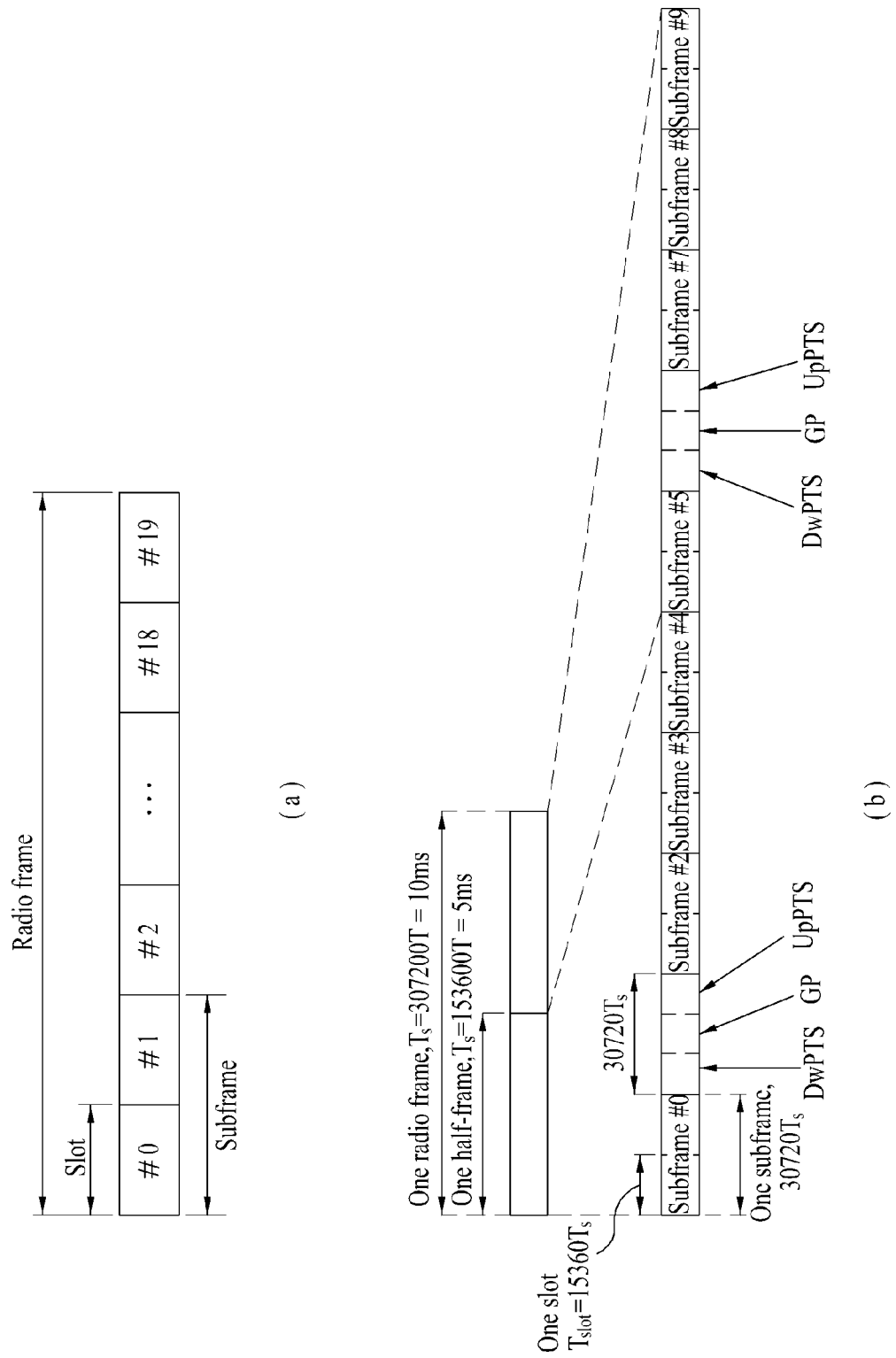
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
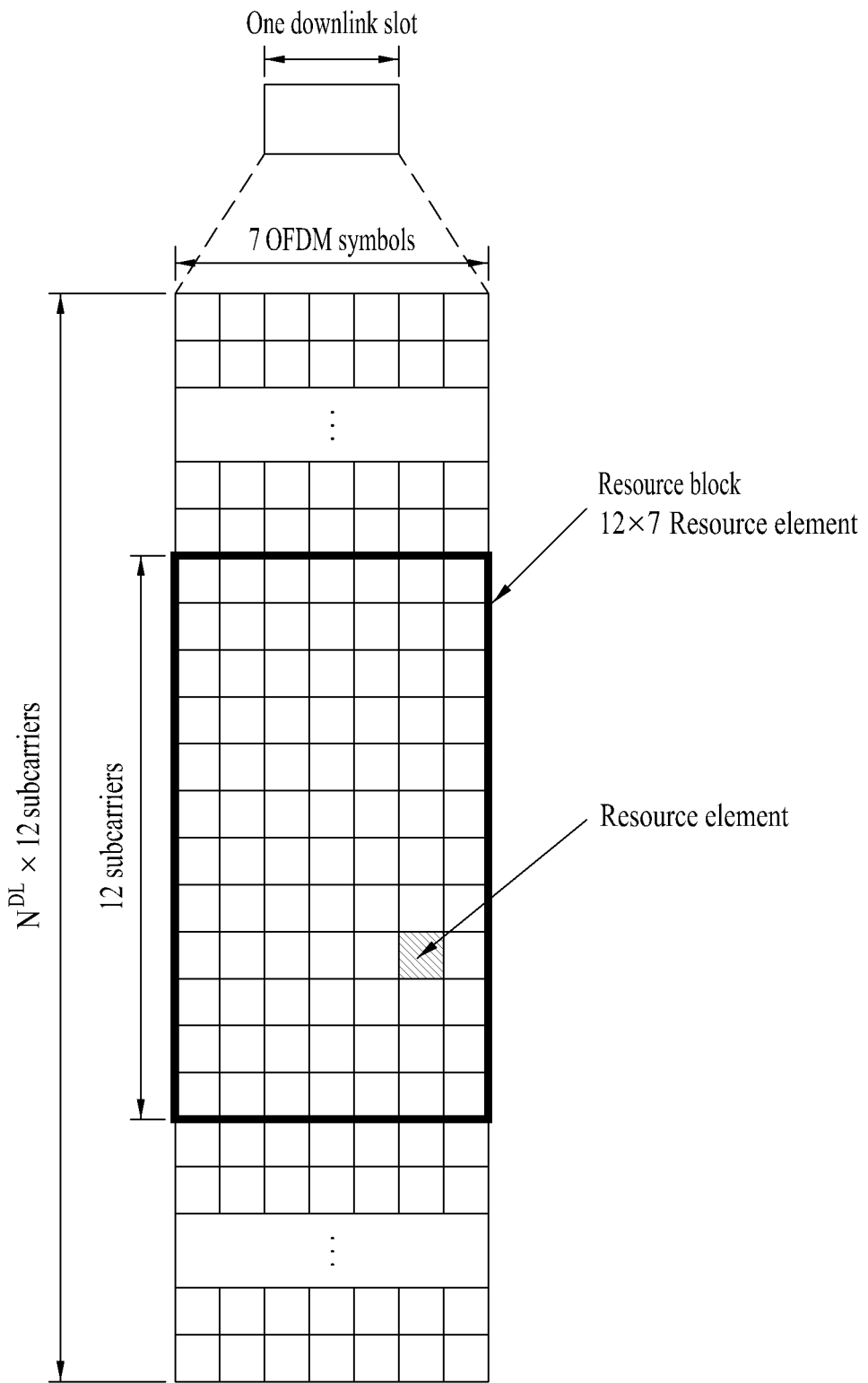
FIG. 2 is a diagram illustrating a resource grid for one downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number $N^{DL}$ of RBs included in a downlink slot depends on a DL transmission bandwidth. A UL slot may have the same structure as a DL slot.

Figure 3:
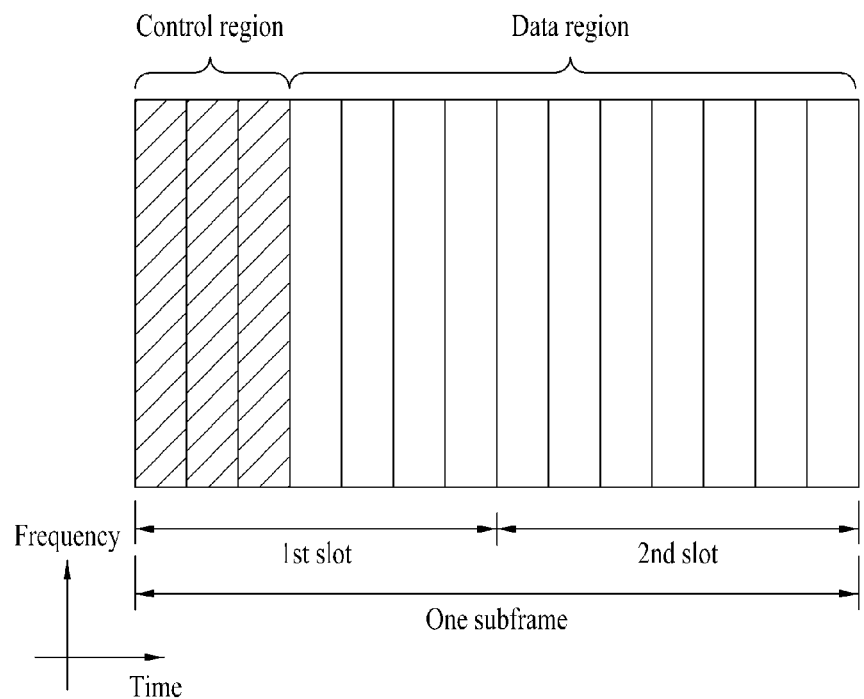
FIG. 3 is a diagram illustrating a DL subframe structure.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
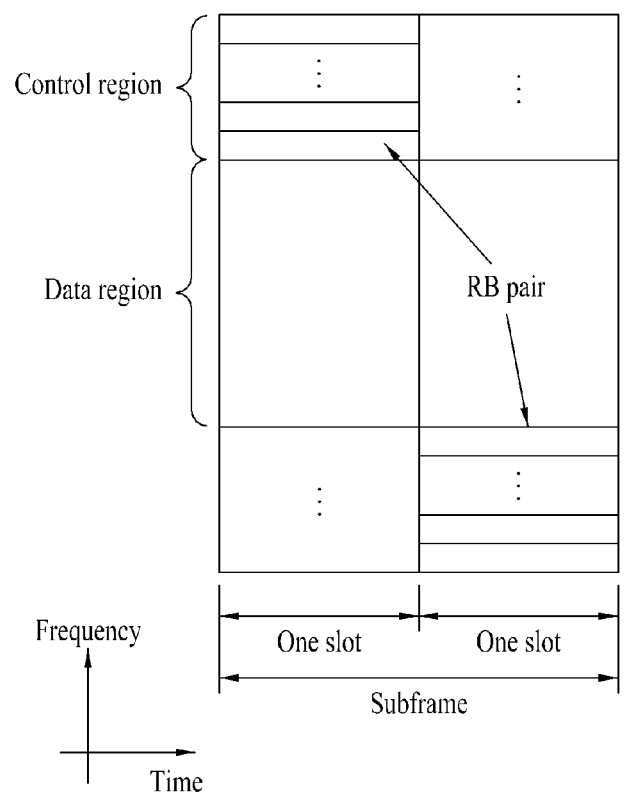
FIG. 4 illustrates an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

PUCCH

UL control information (UCI) transmitted over a PUCCH may include a scheduling request (SR), HARQ ACK/NACK information, and DL channel measurement information.

The HARQ ACK/NACK information may be generated depending on whether decoding of a DL data packet on a PDSCH is successful. In a conventional wireless communication system, 1 bit is transmitted as ACK/NACK information for DL single codeword transmission and 2 bits are transmitted as ACK/NACK information DL 2-codeword transmission.

The channel measurement information may refer to feedback information associated with a multiple input multiple output (MIMO) scheme and include a channel quality indicator (CQI), a precoding matrix index (PMI), and a rank indicator (RI). The channel measurement information may be collectively referred to as CQI. 20 bits may be used per subframe to transmit CQI.

The PUCCH may be demodulated using a binary phase shift keying (BPSK) scheme and a quadrature phase shift keying (QPSK) scheme. Control information of a plurality of UEs may be transmitted over the PUCCH. When code division multiplexing (CDM) is performed to distinguish between signals of UEs, constant amplitude zero autocorrelation (CAZAC) with a length of 12 is mainly used. The CAZAC sequence has characteristics of maintaining a constant amplitude in the time domain and frequency domain and thus is suitable for reduction in peak-to-average power ratio (PAPR) or cubic metric (CM) of a UE to increase coverage. In addition, ACK/NACK information in response to DL data transmitted over a PUCCH is covered using an orthogonal sequence or orthogonal cover (OC).

In addition, control information transmitted on a PUCCH may be distinguished using cyclically shifted sequences having different cyclic shift (CS) values. A cyclically shifted sequence may be generated by cyclically shifting a base sequence by a specific CS amount. The specific CS amount is indicated by a CS index. The number of available CSs may change depending on channel delay spread. Various types of sequences may be used as the base sequence and the aforementioned CAZAC sequence is an example of the base sequence.

In addition, the amount of control information that a UE can transmit in a subframe may be determined depending on the number of SC-FDMA symbols (i.e., SC-FDMA symbols except for an SC-FDMA symbol used to transmit a reference signal (RS) for coherent detection of PUCCH) that can be used to transmit the control information.

In 3GPP LTE, a PUCCH is defined in seven different formats according to transmitted control information, a modulation scheme and the amount of control information. Attributes of transmitted uplink control information (UCI) for each PUCCH format may be summarized as shown in Table 1.

TABLE 1

| PUCCH format | Modulation Scheme | Number of bits per subframe | Usage | Etc. |
|---|---|---|---|---|
| 1 | N/A | N/A | SR (Scheduling Request) | |
| 1a | BPSK | 1 | ACK/NACK | One codeword |
| 1b | QPSK | 2 | ACK/NACK | Two codeword |

TABLE 1-continued

| PUCCH format | Modulation Scheme | Number of bits per subframe | Usage | Etc. |
|---|---|---|---|---|
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

PUCCH format 1 is used to transmit an SR only. When the SR is transmitted alone, an unmodulated waveform is applied, which will be described in detail below.

PUCCH format 1a or 1b is used for transmission of HARQ ACK/NACK. When only HARQ ACK/NACK is transmitted in a subframe, PUCCH format 1a or 1b may be used. Alternatively, HARQ ACK/NACK and SR may be transmitted in the same subframe using PUCCH format 1a or 1b.

PUCCH format 2 is used for transmission of CQI, whereas PUCCH format 2a or 2b is used for transmission of CQI and HARQ ACK/NACK. For the extended CP, PUCCH format 2 may be used for transmission of CQI and HARQ ACK/NACK.

Figure 5:
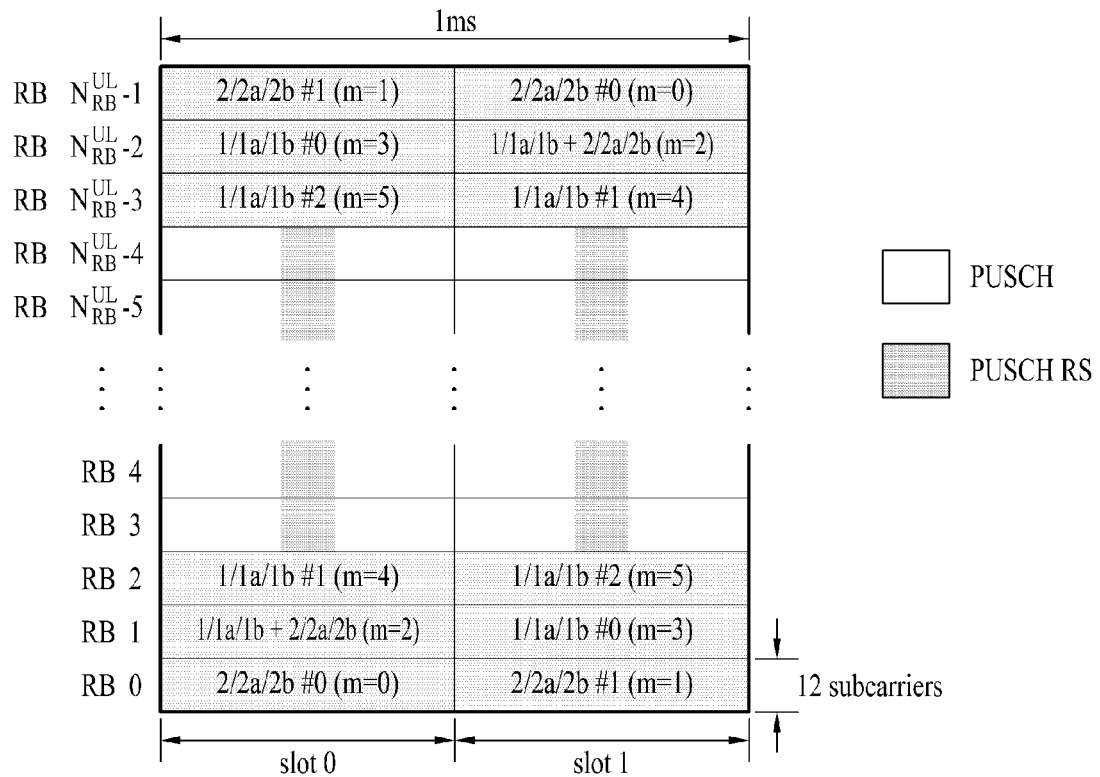
FIG. 5 illustrates mapping of PUCCH formats in a UL physical resource block.

FIG. 5 illustrates mapping of PUCCH formats to PUCCH regions in UL physical resource blocks. In FIG. 5, $n_{PUCC1}^{(2)}$ denotes the number of resource blocks on UL, and 0, 1, ..., $n_{PUCC1}^{(2)}-1$ represent physical resource block numbers. Basically, a PUCCH is mapped to opposite edges of a UL frequency block. As illustrated in FIG. 5, PUCCH formats 2/2a/2b are mapped to PUCCH regions indicated by m=0 and 1, which may represent that PUCCH formats 2/2a/2b are mapped to resource blocks positioned at the band-edges. In addition, PUCCH formats 2/2a/2b and PUCCH formats 1/1a/1b may be mixed and mapped to a PUCCH region indicated by m=2. PUCCH formats 1/1a/1b may be mapped to PUCCH regions indicated by m=3, 4, and 5. The number ($n_{PUCC}^{(1)}$) of available PUCCH RBs may be indicated to UEs in a cell by the PUCCH format 2/2a/2b, through broadcast signaling.

PUCCH Resources

A BS allocates a PUCCH resource for UCI transmission to a UE in an implicit or explicit manner through higher layer signaling.

For ACK/NACK, a plurality of PUCCH resource candidates may be set for the UE by a higher layer. Of the PUCCH resource candidates, a PUCCH resource to be used by the UE may be determined in an implicit manner. For example, the UE may receive a PDSCH from the BS and transmit ACK/NACK for a corresponding data unit through a PUCCH resource implicitly determined by a PDCCH resource that carries scheduling information about the PDSCH.

Figure 6:
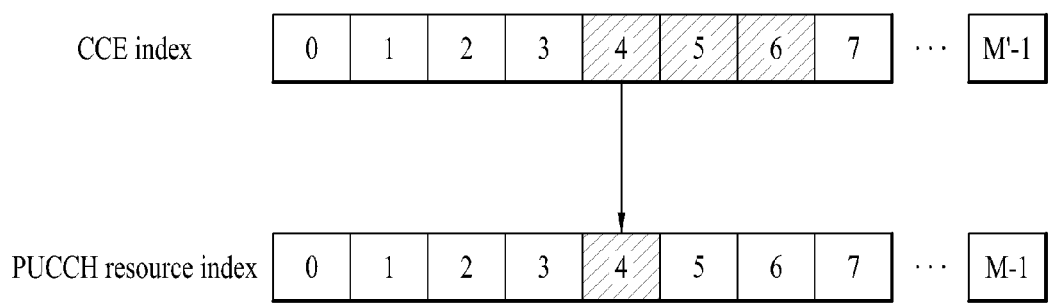
FIG. 6 illustrates an example of determining PUCCH resources for ACK/NACK.

FIG. 6 illustrates an example of determining PUCCH resources for ACK/NACK.

In LTE, a PUCCH resource for ACK/NACK information is not pre-allocated to UEs. Rather, PUCCH resources are used separately by a plurality of UEs within a cell at each time. Specifically, a PUCCH resource that a UE uses to transmit ACK/NACK is implicitly determined based on a PDCCH carrying scheduling information about a PDSCH that delivers the DL data. An entire area in which a PDCCH is transmitted in a DL subframe includes a plurality of control channel elements (CCEs) and a PDCCH transmitted to a UE includes one or more CCEs. A CCE includes a plurality of (e.g., 9) resource element groups (REGs). One REG includes four resource elements (REs) that neighbors each other with an RS excluded. The UE transmits ACK/NACK through an implicit PUCCH resource that is derived or calculated according to a function of a specific CCE index (e.g., the first or lowest CCE index) from among the CCE indexes included in a PDCCH received by the UE.

Referring to FIG. 6, each PUCCH resource index corresponds to a PUCCH resource for ACK/NACK. As illustrated in FIG. 6, suppose that scheduling information about the PDSCH is transmitted to the UE on a PDCCH including CCEs #4, #5 and #6. The UE transmits ACK/NACK to a BS on a PUCCH, for example, PUCCH #4 that is derived or calculated from the lowest CCE index 4 constituting the PDCCH. FIG. 6 illustrates a case in which up to M' CCEs are present in the DL and up to M PUCCHs are present in UL. M may be equal to M', but it is also possible to set M to be different from M' and to map CCEs to PUCCHs in an overlapping manner.

For example, a PUCCH resource index may be determined by the following equation.

$$n_{PUCCH}^{(1)} = n_{CCE} + N_{PUCCH}^{(1)}$$   Equation 1

Herein, $n_{PUCCH}^{(1)}$ denotes the index of a PUCCH resource for transmission of ACK/NACK, and $N_{PUCCH}^{(1)}$ denotes a signaling value received from a higher layer. $n_{CCE}$ may denote the lowest index of the CCE indexes used for transmission of a PDCCH.

PUCCH Channel Structure

PUCCH formats 1a/1b will be described first below.

In PUCCH formats 1a/1b, a symbol modulated using BPSK or QPSK is multiplied by a CAZAC sequence having a length of 12. For example, multiplying a modulation symbol d(0) by a CAZAC sequence r(n) (n=0, 1, 2, ..., N−1) having a length of N gives a result of y(0), y(1), y(2), ..., y(N−1). Symbols y(0), y(1), y(2), ..., and y(N−1) may be called a block of symbols. After the modulation symbol is multiplied by the CAZAC sequence, block-wise-spreading using an orthogonal sequence is applied.

A Hadamard sequence with a length of 4 is employed for general ACK/NACK information, while a discrete Fourier transform (DFT) with a length of 3 is employed for shortened ACK/NACK information and a reference signal. For an extended CP, a Hadamard sequence with a length of 2 is employed for a reference signal.

Figure 7:
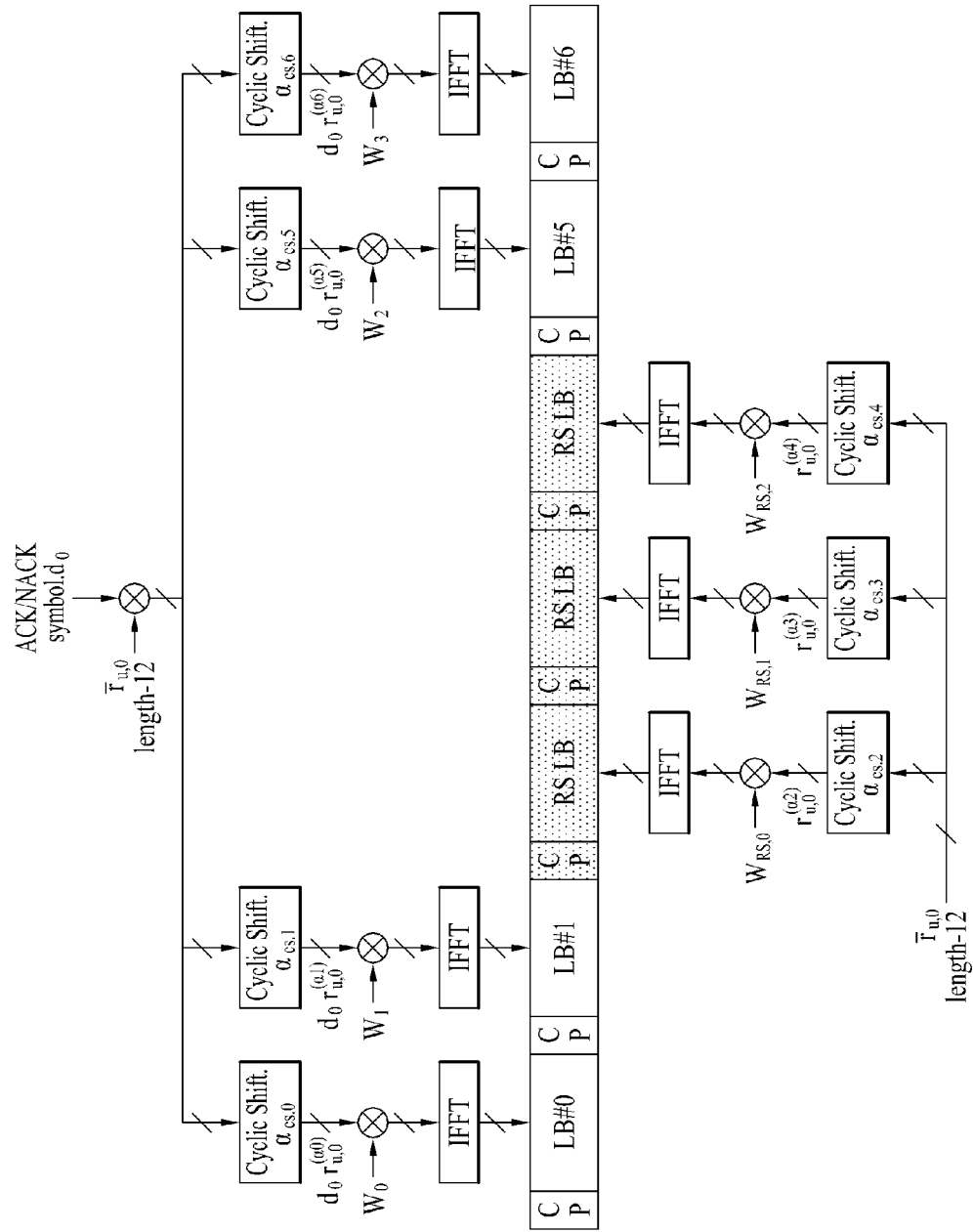
FIG. 7 illustrates an ACK/NACK channel structure for a normal cyclic prefix (CP).

FIG. 7 illustrates an ACK/NACK channel structure for a normal CP. FIG. 7 exemplarily shows the structure of a PUCCH channel for transmission of HARQ ACK/NACK without CQI. Three consecutive SC-FDMA symbols in the middle of seven SC-FDMA symbols carry RSs and the remaining four SC-FDMA symbols carry ACK/NACK signals. For the extended CP, two consecutive symbols in the middle of SC-FDMA symbols may carry RSs. The number and positions of symbols used for an RS may change depending on a control channel, and the number and positions of symbols used for a ACK/NACK signal associated with the RS may change depending on the number and positions of symbols used for the RS.

1-bit ACK/NACK information and 2-bit ACK/NACK information (which is unscrambled) may be represented in a HARQ ACK/NACK modulation symbol using BPSK and QPSK, respectively. ACK may be encoded as 1, and NACK may be encoded as 0.

When a control signal is transmitted within an allocated band, 2-dimensional spreading is applied to enhance multiplexing capacity. That is, frequency domain spreading and time domain spreading are simultaneously applied to increase the number of UEs or control channels that can be multiplexed. To spread an ACK/NACK signal in the frequency domain, a frequency domain sequence is used as a basic sequence. A Zadoff-Chu (ZC) sequence, one of CAZAC sequences, may be used as the frequency domain sequence. For example, different cyclic shifts (CSs) may be applied to a ZC sequence, which is the basic sequence, to multiplex different UEs or different control channels. The number of CS resources supported by SC-FDMA symbols for PUCCH RBs for HARQ ACK/NACK transmission is set by a cell-specific higher-layer signaling parameter), and ($\Delta_{shift}^{PUCCH}$), and $\Delta_{shift}^{PUCCH} \in \{1, 2, 3\}$ represents 12, 6 or 4 shifts.

A frequency-domain-spread ACK/NACK signal is spread in the time domain using an orthogonal spreading code. As the orthogonal spreading code, a Walsh-Hadamard sequence or a DFT sequence may be used. For example, the ACK/NACK signal may be spread using orthogonal sequences (w0, w1, w2, w3) with a length of 4 for four symbols. In addition, the RS may also be spread using an orthogonal sequence with a length of 3 or 2, which is referred to as orthogonal covering (OC).

A plurality of UEs may be multiplexed in a code division multiplexing (CDM) scheme using CS resources in the frequency domain and OC resources in the time domain as described above. That is, ACK/NACK information and RSs of a large number of UEs may be multiplexed on the same PUCCH RB.

In time domain spreading CDM, the number of supported spreading codes for the ACK/NACK information is restricted by the number of RS symbols. That is, the number of SC-FDMA symbols for RS transmission is smaller than the number of SC-FDMA symbols for ACK/NACK transmission, and therefore multiplexing capacity of an RS is lower than multiplexing capacity of the ACK/NACK information. For example, in the case of a normal CP, the ACK/NACK information may be transmitted in four symbols, but three orthogonal spreading codes are used rather than four orthogonal spreading codes for the ACK/NACK information. This is because the number of RS transmission symbols is limited to three and thus only three orthogonal spreading codes can be used for the RS.

Examples of an orthogonal sequence used in spreading ACK/NACK information are shown in Tables 2 and 3. Table 2 shows a sequence for a symbol having a length of 4 and Table 3 shows a sequence for a symbol having a length of 3. The sequence for the symbol having a length of 4 is used in PUCCH formats 1/1a/1b of a normal subframe configuration. Considering a case in which an SRS is transmitted on the last symbol of the second slot in a subframe configuration, the sequence for the symbol with the length of 4 may be applied to the first slot and shortened PUCCH formats 1/1a/1b of the sequence for the symbol with the length of 3 may be applied to the second slot.

TABLE 2

| Sequence index $n_{oc}^{(\tilde{p})}(n_s)$ | Orthogonal sequences [w(0) ... w($N_{SF}^{PUCCH}$ − 1)] |
| --- | --- |
| 0 | [+1 +1 +1 +1] |
| 1 | [+1 −1 +1 −1] |
| 2 | [+1 −1 −1 +1] |

TABLE 3

| Sequence index $n_{oc}^{(\tilde{p})}(n_s)$ | Orthogonal sequences [w(0) ... w($N_{SF}^{PUCCH}$ − 1)] |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

When three symbols are used for RS transmission and four symbols are used for ACK/NACK information transmission in a slot of a subframe of the normal CP, if, for example, six CSs in the frequency domain and three OC resources in the time domain are allowed to be used, HARQ ACK/NACK signals from 18 different UEs may be multiplexed in a PUCCH RB. When two symbols are used for RS transmission and four symbols are used for ACK/NACK information transmission in a slot of a subframe of the extended CP, if, for example, six CSs in the frequency domain and two OC resources in the time domain are allowed to be used, HARQ ACK/NACK signals from 12 different UEs may be multiplexed in a PUCCH RB.

Hereinafter, PUCCH format 1 will be described. A scheduling request (SR) is transmitted by requesting scheduling of the UE or not requesting scheduling of the UE. An SR channel reuses an ACK/NACK channel structure in PUCCH formats 1a/1b and is configured in an on-off keying (OOK) manner based on the design of the ACK/NACK channel. An RS is not transmitted on an SR channel. Thus, a sequence with a length of 7 is used in the case of the normal CP, and a sequence with a length of 6 is used in the case of the extended CP. Different CSs or orthogonal covers may be allocated to an SR and ACK/NACK. That is, in implementing transmission of a positive SR, the UE transmits HARQ ACK/NACK through resources allocated for the SR. In implementing transmission of a negative SR, the UE transmits HARQ ACK/NACK through resources allocated for ACK/NACK.

Hereinafter, PUCCH formats 2/2a/2b will be described. PUCCH formats 2/2a/2b are control channels for transmission of channel measurement feedback (CQI, PMI and RI).

A report period of the channel measurement feedback (hereinafter, referred to as CQI information) and a frequency unit (or frequency resolution) subject to measurement may be controlled by a BS. Periodic and aperiodic CQI reports may be supported in the time domain. PUCCH format 2 may be used only for the periodic report and a PUSCH may be used for the aperiodic report. In the case of the aperiodic report, the BS may instruct the UE to transmit an individual CQI report on a resource scheduled for UL data transmission.

Figure 8:
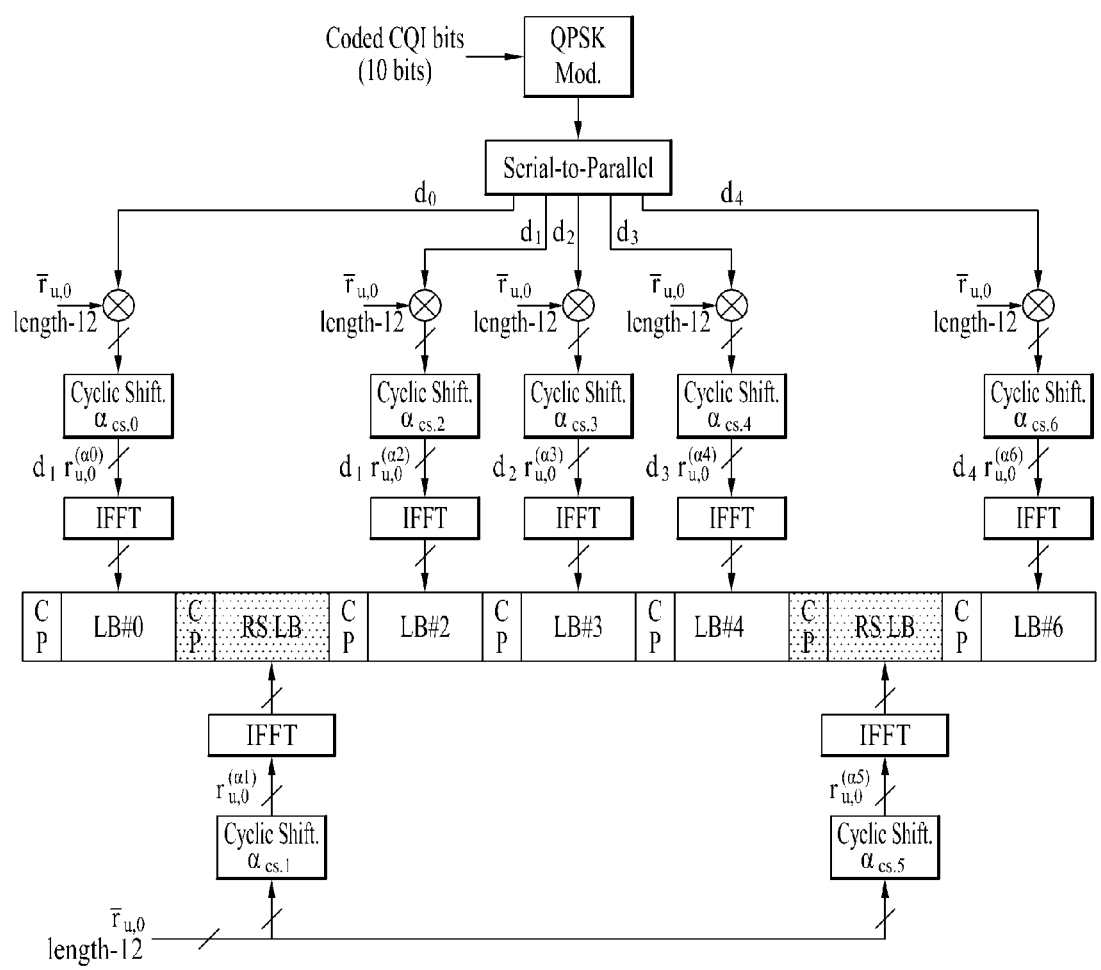
FIG. 8 illustrates a CQI channel structure for a normal CP.

FIG. 8 illustrates a CQI channel structure for a normal CP. SC-FDMA symbols #1 and #5 (second and sixth symbols) from among SC-FDMA symbols #0 to #6 of a slot may be used to transmit a demodulation reference signal (DMRS), and CQI information may be transmitted in the remaining SC-FDMA symbols. In the case of an extended CP, one SC-FDMA symbol (SC-FDMA symbol #3) is used to transmit the DMRS.

In PUCCH formats 2/2a/2b, modulation by a CAZAC sequence is supported, and a symbol modulated according to QPSK is multiplied by a CAZAC sequence with a length of 12. The CS of the sequence is changed between symbols and between slots. OC is used for the DMRS.

Of the seven SC-FDMA symbols included in a slot, two SC-FDMA symbols spaced apart by an interval of three SC-FDMA symbols carry DMRSs and the remaining five SC-FDMA symbols carry CQI information. Two RSs are used in a slot in order to support a high-speed UE. A UE is identified using a CS sequence. CQI information symbols are modulated into SC-FDMA symbols and transmitted. An SC-FDMA symbol includes a sequence. That is, a UE modulates CQI into each sequence and transmits the sequences.

The number of symbols that can be transmitted in a TTI is 10 and QPSK is determined for modulation of CQI information. When QPSK mapping is employed for the SC-FDMA symbols, an SC-FDMA symbol may carry a 2-bit CQI value and thus a slot may carry a 10-bit CQI value. Accordingly, a maximum of a 20-bit CQI value may be carried in a subframe. To spread the CQI information in the frequency domain, a frequency domain spreading code is used.

A CAZAC sequence with a length of 12 (e.g., a ZC sequence) may be used for the frequency domain spreading code. Control channels may be distinguished from each other using CAZAC sequences having different CS values. The frequency-domain-spread CQI information is subjected to IFFT.

12 different UEs may be orthogonally multiplexed in the same PUCCH RB using 12 equally spaced CSs. For the normal CP, a DMRS sequence on SC-FDMA symbols #1 and #5 (SC-FDMA symbols #3 for the extended CP) is similar to a CQI signal sequence in the frequency domain, but the DMRS sequence is not modulated as in the case of the CQI information. A UE may be semi-statically set by higher layer signaling so as to periodically report different CQI, PMI and RI types on a PUCCH resource indicated by a PUCCH resource index $n_{PUCCH}^{(2)}$. Herein, the PUCCH resource index is information indicating a PUCCH region and a CS value used for PUCCH format 2/2a/2b transmission.

Hereinafter, an enhanced-PUCCH (e-PUCCH) format will be described. The e-PUCCH format may correspond to PUCCH format 3 in LTE-A. Block spreading may be applied to ACK/NACK transmission using PUCCH format 3.

Block spreading is a method of modulating a control signal using SC-FDMA, which is distinguished from the PUCCH format 1 or 2 series. As shown in FIG. 9, a symbol sequence may be spread in the time domain using an orthogonal cover code (OCC) and transmitted. Control signals of a plurality UEs may be multiplexed in the same RB using the OCC. In the case of PUCCH format 2 described above, a symbol sequence is transmitted in the time domain and control signals of multiple UEs are multiplexed using a CS of a CAZAC sequence. On the other hand, in the case of a block spreading-based PUCCH format (e.g., PUCCH format 3), a symbol sequence is transmitted in the frequency domain and control signals of multiple UEs are multiplexed through the time domain spreading based on an OCC.

FIG. 9(a) illustrates an example of generation and transmission of four SC-FDMA symbols (i.e., data portions) using an OCC with a length of 4 (or spreading factor (SF)=4) in a symbol sequence during one slot. In this case, three RS symbols (i.e., RS portions) may be used in one slot.

FIG. 9(b) illustrates an example of generation and transmission of five SC-FDMA symbols (i.e., data portions) using an OCC with a length of 5 (or SF=5) in a symbol sequence during one slot. In this case, two RS symbols may be used in one slot.

In the examples of FIG. 9, the RS symbols may be generated from a CAZAC sequence to which a specific CS value is applied, and a predetermined OCC may be applied to (or multiplied by) a plurality of RS symbols and transmitted. If 12 modulation symbols are used per OFDM symbol (or SC-FDMA symbol) and each modulation symbol is generated according to QPSK in the examples of FIG. 9, the maximum number of bits that can be transmitted in a slot is 12×2=24. Thus, the total number of bits that can be transmitted in two slots is 48. When the PUCCH channel structure employing the block spreading scheme is used, it may be possible to transmit extended control information compared to the case of existing PUCCH formats 1 and 2.

ACK/NACK Multiplexing Scheme

In ACK/NACK multiplexing, content of an ACK/NACK to a plurality of data units may be identified by a combination of an ACK/NACK unit actually used for ACK/NACK transmission and one of QPSK-modulated symbols. For example, suppose that an ACK/NACK unit carries 2-bit information and receives a maximum of two data units. Herein, it is assumed that a HARQ ACK/NACK for each of the received data units is represented by an ACK/NACK bit. In this case, a transmitter that has transmitted data may identify the ACK/NACK results as shown below in Table 4.

TABLE 4

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 4, HARQ-ACK(i) (i=0, 1) represents an ACK/NACK result with respect to data unit i. Since a maximum of two data units (data unit 0 and data unit 1) is assumed to be received as described above, an ACK/NACK result with respect to data unit 0 is represented as HARQ-ACK(0) and an ACK/NACK result with respect to data unit 1 is represented as HARQ-ACK(1) in Table 4. Referring to Table 4, DTX (Discontinuous Transmission) indicates that the data unit corresponding to HARQ-ACK(i) is not transmitted or that a receiver cannot detect presence of the data unit corresponding to HARQ-ACK(i). In addition, $n_{PUCCH,X}^{(1)}$ denotes an ACK/NACK unit actually used for ACK/NACK transmission. When there is a maximum of two ACK/NACK units, the ACK/NACK units may be represented as $n_{PUCCH,0}^{(1)}$ and $n_{PUCCH,1}^{(1)}$. In addition, b(0), b(1) denote two bits transmitted by selected ACK/NACK units. Modulation symbols transmitted through ACK/NACK units are determined depending on bits of b(0) and b(1).

For example, when the receiver successfully receives and decodes two data units (as indicated by ACK, ACK in Table 4), the receiver transmits two bits (1, 1) using the ACK/NACK unit $n_{PUCCH,1}^{(1)}$. If the receiver fails to decode (or detect) the first data unit (i.e., data unit 0 corresponding to HARQ-ACK(0)) of the two received data units and successfully decodes the second data unit (i.e. data unit 1 corresponding to HARQ-ACK(1)) (as indicated by NACK/DTX, ACK in Table 4), the receiver transmits two bits (0, 0) using the ACK/NACK unit $n_{PUCCH,1}^{(1)}$.

As such, it is possible to transmit ACK/NACK information about a plurality of data units using one ACK/NACK unit by linking or mapping a combination of a selected ACK/NACK unit and actual bits of the transmitted ACK/NACK unit (i.e., a combination of selected $n_{PUCCH,0}^{(1)}$ or $n_{PUCCH,1}^{(1)}$ and b(0), b(1) in Table 4) to the content of actual ACK/NACK. ACK/NACK multiplexing for more than two data units may be readily implemented by extending the principle of the above-described ACK/NACK multiplexing.

In the ACK/NACK multiplexing scheme described above, NACK and DTX may not be discriminated from each other when at least one ACK is present for each data unit (that is, NACK and DTX may be coupled as NACK/DTX as shown in Table 4). This is because all ACK/NACK states (i.e., ACK/NACK hypotheses) that may be generated when NACK and DTX are discriminated from each other cannot be represented by only combinations of ACK/NACK units and QPSK-modulated symbols. When ACK is not present for any data unit (i.e., when only NACK or DTX is present for all data units), a single definite case of NACK indicating that only one of HARQ-ACKs(i) is a definite NACK (i.e., NACK discriminated from DTX) may be defined. In this case, an ACK/NACK unit corresponding to a data unit for a definite NACK may be reserved for transmission of a plurality of ACK/NACK signals.

PUCCH Piggyback

In UL transmission in a legacy 3GPP LTE system (e.g., a Release-8 system), single carrier transmission with good cubic metric (CM) property or a good peak-to-average power ratio (PAPR), which affects performance of a power amplifier, is maintained to effectively utilize the power amplifier of the UE. That is, single carrier characteristics of data to be transmitted may be maintained through DFT-precoding in the case of PUSCH transmission in the legacy LTE system. In the case of PUCCH transmission, single carrier characteristics may be maintained by carrying information on a sequence having single carrier characteristics. However, if DFT-precoded data is non-continuously assigned on a frequency axis, or if PUSCH and PUCCH are simultaneously transmitted, such single carrier characteristics are not maintained.

Figure 10:
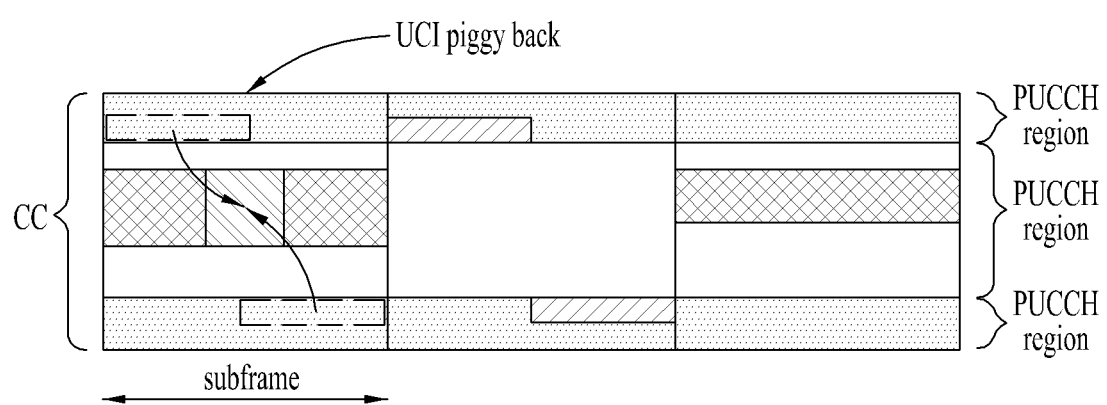
FIG. 10 illustrates a method for transmitting UL control information on a PUSCH.

Thus, when PUSCH transmission takes place in the same subframe as that for PUCCH transmission as illustrated in FIG. 10, uplink control information (UCI) to be transmitted on a PUCCH may be piggybacked together with data over a PUSCH in order to maintain the single carrier characteristics.

As described above, the legacy LTE UE cannot simultaneously transmit the PUCCH and the PUSCH, and thus the UE multiplexes UCI (CQI/PMI, HARQ-ACK, RI, etc.) in a PUSCH region in a subframe in which the PUSCH is transmitted. For example, when CQI and/or PMI is transmitted in a subframe assigned for PUSCH transmission, UL-SCH data and CQI/PMI may be multiplexed prior to DFT-spreading, such that control information and data are simultaneously transmitted. In this case, rate matching is performed for the UL-SCH data in consideration of CQI/PMI resources. In addition, control information such as HARQ ACK and RI may be multiplexed in the PUSCH region by puncturing the UL-SCH data.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into an UL RS and a DL RS. In a current LTE system, the UL RS includes:

i) a demodulation-reference signal (DM-RS) for channel estimation for coherent demodulation of information transmitted over a PUSCH and a PUCCH, and ii) a sounding reference signal (SRS) for measuring UL channel quality at frequencies of different networks in the BS.

The DL RS includes:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographical position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

Figure 11:
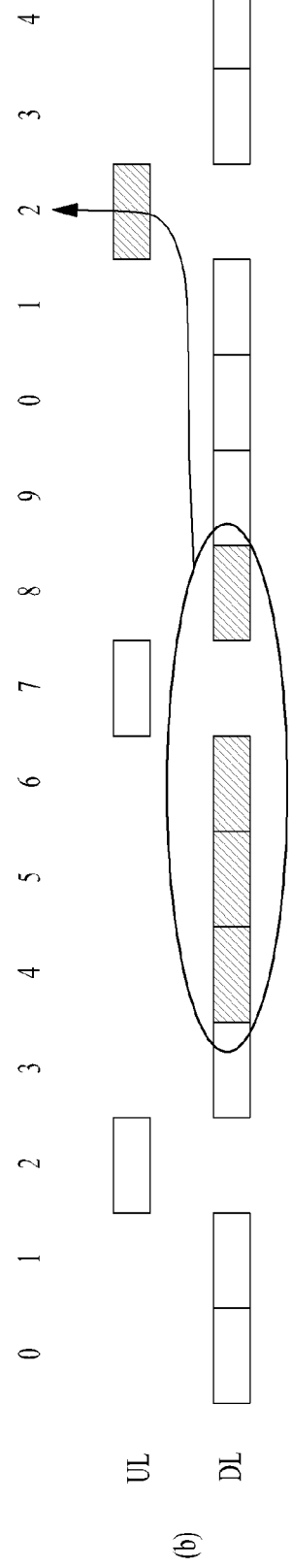
FIG. 11 illustrates reception acknowledgement in TDD.

FIG. 11 is a diagram illustrating a pattern in which CRSs and DRSs defined in a legacy 3GPP LTE system (e.g., Release-8) are mapped onto resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 11(a)) and a length of 12 OFDM symbols for an extended CP (FIG. 11(b)).

FIG. 11 shows locations of RSs on RB pairs in a system in which the BS supports four transmit antennas. In FIG. 11, resource elements (REs) denoted by "0", "1", "2" and "3" represent the locations of the CRSs for antenna port indexes 0, 1, 2 and 3, respectively. In FIG. 11, REs denoted by "D" represent locations of the DMRSs.

Enhanced-PDCCH (EPDCCH)

In an LTE system after Release 11, an enhanced-PDCCH (EPDCCH) which can be transmitted through the existing PDSCH region is considered as a solution to lack of capacity of a PDCCH due to coordinated multi-point (CoMP), multi user-multiple input multiple output (MU-MIMO), and the like and degradation of PDCCH performance due to inter-cell interference. In addition, with the EPDCCH, channel estimation may be performed based on DMRSs contrary to the existing CRS-based PDCCH in order to obtain a pre-coding gain.

EPDCCH transmission may be divided into localized EPDCCH transmission and distributed EPDCCH transmission according to configuration of a physical resource block (PRB) used for EPDCCH transmission. The localized EPDCCH transmission represents the case in which enhanced control channel elements (ECCEs) used in transmitting one DCI neighbor each other in the frequency domain, and may employ specific pre-coding to obtain a beamforming gain. For example, localized EPDCCH transmission may be based on consecutive ECCEs the number of which corresponds to an aggregation level. On the other hand, the distributed EPDCCH transmission represents the case in which an EPDCCH is transmitted on separated PRB pairs in the frequency domain. Distributed EPDCCH transmission has a benefit in terms of frequency diversity. For example, distributed EPDCCH transmission may be based on ECCEs including four EREGs contained in each PRB pair separated in the frequency domain. For the UE, one or two EPDCCH PRB sets may be configured by higher layer signaling, and each EPDCCH PRB set may be intended for one of localized EDPCCH transmission and distributed EPDCCH transmission.

The UE may perform blind decoding as in a legacy LTE/LTE-A system to receive/acquire DCI over an EPDCCH. More specifically, the UE may attempt to decode (or monitor) a set of EPDCCH candidates at each aggregation level, for DCI formats corresponding to set transmission modes. Herein, the set of EPDCCH candidates subjected to monitoring may be referred to as a specific search space for the EPDCCH UE, and the search space may be set/configured for each aggregation level. In addition, the aggregation levels may be {1, 2, 4, 8, 16, 32} according to a type of a subframe, the length of a CP, and the amount of available resources in a PRB pair, which is more or less different from the case of a legacy LTE/LTE-A system.

For a UE having an EPDCCH configured, REs included in a PRB pair set are indexed by EREGs, and the EREGs are in turn indexed by ECCEs. EPDCCH candidates configuring the search space may be determined based on the indexed ECCEs and then blind decoding may be performed. Thereby, control information may be received. Herein, EREG corresponds to REG in the legacy LTE/LTE-A and ECCE corresponds to CCE in the legacy LTE/LTE-A. A PRB pair may include 16 EREGs.

Transmission of EPDCCH and Reception Acknowledgement

The UE having received an EPDCCH may transmit an ACK/NACK/DTX for the EPDCCH over the PUCCH. The index of a resource, i.e., a PUCCH resource may be determined by the lowest ECCE index of the ECCE indexes used for transmission of the EPDCCH in a manner similar to Equation 1 discussed above. That is, the index may be expressed as Equation 2 given below.

$$n_{PUCCH\text{-}ECCE}^{(1)} = n_{ECCE} + N_{PUCCH}^{(1)} \quad \text{Equation 2}$$

In Equation 2 $n_{PUCCH\text{-}ECCE}^{(1)}$ is the index of the PUCCH resource, $n_{ECCE}$ is the lowest ECCE index of the ECCE indexes used in transmitting the EPDCCH, and $N_{PUCCH}^{(1)}$ (which may be replaced by $N_{PUCCH,EPDCCH}^{(1)}$), which is a value delivered through higher layer signaling, represents the point where the PUCCH resource index starts.

In the case in which a PUCCH resource index is determined solely by Equation 2, resource collision may occur. For example, if two EPDCCH PRB sets are configured, ECCE indexing is independently conducted in each EPDCCH PRB set, and thus the lowest ECCE indexes of the EPDCCH PRB sets may equal each other. This problem may be addressed by setting different start points of the PUCCH resources for different users. However, setting the start point of the PUCCH resource differently for every user results in reservation of many PUCCH resources and is thus inefficient. In addition, DCI of multiple users may be transmitted over the EPDCCH at the same ECCE location as in the case of MU-MIMO, and therefore there is also a need for a method for allocation of PUCCH resources considering the aforementioned case. To address the problem as described above, HARQ-ACK Resource Offset (ARO) has been introduced. ARO allows avoidance of PUCCH resource collision by shifting the PUCCH resources, which are determined by the lowest ECCE index of the ECCE indexes configuring an EPDCCH and the start offsets of the PUCCH resources conveyed through higher layer signaling, to a predetermined extent. ARO is indicated by 2 bits in DCI formats 1A/1B/1D/1/2A/2/2B/2C/2D transmitted over the EPDCCH, as shown below in Table 5.

TABLE 5

| ACK/NACK Resource offset field in DCI format 1A/1B/1D/1/2A/2/2B/2C/2D | $\Delta_{ARO}$ |
| --- | --- |
| 0 | 0 |
| 1 | −1 |
| 2 | −2 |
| 3 | 2 |

A BS designates one of the ARO values in Table 5 for a specific UE, and then informs, through a DCI format, the specific UE of an ARO to use in determining a PUCCH resource. The UE may detect an ARO field in the DCI format thereof and transmit a reception acknowledgement through a PUCCH resource determined using the detected field value.

In TDD unlike in FDD, UL and DL are not separated from each other. Accordingly, there may be a case in which ACK/NACK for multiple DL subframes (of a PDSCH) needs to be transmitted in one UL subframe. This case will be described with reference to FIG. 11. FIG. 11(a) illustrates uplink-downlink configurations used in TDD, and FIG. 11(b) illustrates ACK/NACK for TDD UL-DL configuration 2. Referring to FIG. 11, in TDD UL-DL configuration 2, subframes usable for UL are limited to subframes #2 and #7. Accordingly, an ACK/NACK response to eight DL subframes (including a special subframe) needs to be transmitted through two UL subframes (subframe #2, and subframe #7). To this end, DL association set indexes are defined as shown in Table 6 below.

TABLE 6

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

DL association set K includes elements of $\{k_0, k_1, \ldots k_{M-1}\}$ in each UL subframe, and the bundling window size M represents the number of DL subframes in the association set K in which ACK/NACK should be transmitted. In Table 6, each number indicates the number of subframes back to a DL subframe from the current UL subframe. For example, in UL-DL configuration 2, ACK/NACK for the 8th, 7th, 4th and 6th subframes (i.e., subframes 4, 5, 8 and 6 of the previous radio frame) preceding subframe #2 is transmitted in subframe #2 as shown in FIG. 11(*b*).

In order to transmit ACK/NACK for multiple DL subframes in one UL subframe, a resource allocation scheme in which PUCCH resources are sequentially attached to each other according to the order of the association set for each EPDCCH PRB set is used. In UL-DL configuration 5, for example, a PUCCH resource region for subframes corresponding to association set {13, 12, 9, 8, 7, 5, 4, 11, 6} is reserved in subframe 2 for EPDCCH-PRB set j. This example is illustrated in FIG. 12. Referring to FIG. 12, each block is a PUCCH resource region for each subframe corresponding to an association set, m is the index of a DL subframe to be transmitted in subframe #2 (i.e., the sequential indexes in association set {13, 12, 9, 8, 7, 5, 4, 11, 6}. For example, m=1 corresponds to 12 (the twelfth preceding subframe from subframe #2=subframe #0 of the last preceding radio frame)), and $N_{eCCE, i, j}$ is the number of ECCEs of i-th subframe in EPDCCH-PRB-set j.

However, reserving all the PUCCH resource regions for multiple DL subframes in a UL subframe as in FIG. 12 may result in waste of the PUCCH resources. To prevent such waste, using an ARO value, which is a negative value of a large magnitude, may be considered. For example, if $$-\sum_{i=0}^{m-1} N_{eCCE,i,j} - 2$$

is used as the ARO value, a PUCCH resource for subframe m may be moved to a PUCCH resource region of a previous subframe (specifically, the first subframe in the association set). However, when ARO is used, if there is a large number of DL subframes as in UL-DL configuration 5, the PUCCH resources of that many DL subframes are concentrated in the PUCCH resource of the first subframe in the association set, and thus PUCCH resource collision may occur. Accordingly, ARO to address both waste of PUCCH resources resulting from reservation of PUCCH resources for many UL subframes and PUCCH resource collision resulting from use of a large negative value of ARO will be discussed below. The basic principle of embodiments given below is that DL SFs in a bundling window are divided into S groups, each of the S groups includes a different ARO value, and the ARO value is movable to a different specific SF in each group. Hereinafter, embodiments of the present invention will be discussed in detail.

Embodiment 1

In the case in which ACK/NACK related to two or more subframes is to be transmitted in a UL subframe (i.e., M>1), a set of possible value for the ARO includes an ARO value as in Equation 3 below.

$$-\sum_{i=m-\lceil m/3 \rceil}^{m-1} N_{eCCE,i,j} - 1 \qquad \text{Equation 3}$$

Herein, m denotes an index of two or more subframes (the aforementioned sequential index), and $N_{eCCE, i, j}$ denotes the number of ECCEs of i-th subframe in EPDCCH-PRB-set j.

The ARO value according to Equation 3 (i.e., a first ARO (value)) may move/shift the PUCCH resource of a specific subframe to a PUCCH resource region for a subframe prior to the specific subframe (which may correspond to the ARO region of the specific subframe even after application of ARO depending on the shift amount). Further, the first ARO value performs functions to provide a different shift amount depending on which group the specific subframe belongs to among the groups related to two or more subframes, which will be described in more detail with reference to FIG. 13.

Figure 13:
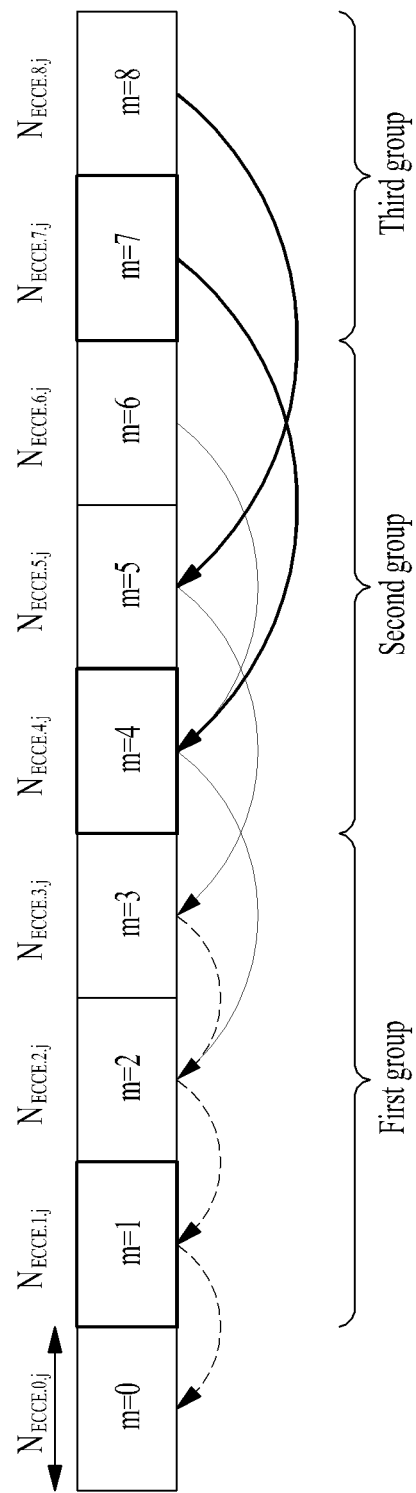

FIG. 13 is a diagram illustrating stacking of PUCCH resource regions for DL subframes corresponding to an association set in subframe #2 in the case of UL-DL configuration 5 as shown in FIG. 12. Each block is a PUCCH resource region for each subframe corresponding to an association set, m is the index of a DL subframe to transmit in subframe #2 (i.e., the sequential indexes in association set {13, 12, 9, 8, 7, 5, 4, 11, 6}), and $N_{eCCE, i, j}$ is the number of ECCEs of i-th subframe in EPDCCH-PRB-set j.

Referring back to Equation 3, ARO values according to m under the condition as in FIG. 13 are given as in Table 7 below.

TABLE 7

| m | $-\sum_{i=m-\lceil m/3 \rceil}^{m-1} N_{eCCE,i,j} - 1$ |
|---|---|
| 1 | $-N_{eCCE,0,j}-1$ |
| 2 | $-N_{eCCE,1,j}-1$ |
| 3 | $-N_{eCCE,2,j}-1$ |
| 4 | $-N_{eCCE,2,j}-N_{eCCE,3,j}-1$ |
| 5 | $-N_{eCCE,3,j}-N_{eCCE,4,j}-1$ |

TABLE 7-continued

| m | $-\sum_{i=m-\lceil m/3\rceil}^{m-1} N_{eCCE,i,j} - 1$ |
|---|---|
| 6 | $-N_{eCCE,4,j}-N_{eCCE,5,j}-1$ |
| 7 | $-N_{eCCE,4,j}-N_{eCCE,5,j}-N_{eCCE,6,j}-1$ |
| 8 | $-N_{eCCE,5,j}-N_{eCCE,6,j}-N_{eCCE,7,j}-1$ |

Referring to Table 7, for $m$ between 1 and 3 (i.e., between the second subframe and the fourth subframe in the association set), the ARO value is −(the number of ECCEs of the last preceding subframe+1). In addition, for m between 4 and 6 (i.e., between the fifth subframe and the seventh subframe in the association set), the ARO value is −(the number of ECCEs of the last two preceding subframes+1). For m between 7 and 8 (i.e., between the eighth subframe and the ninth subframe in the association set), the ARO value is −(the number of ECCEs of the last three preceding subframes+1).

That is the first ARO value provides/allocates different shift amounts (i.e., a shift amount by the number of ECCEs of the last preceding subframe+1 for the first group, a shift amount by the number of ECCEs of the last two preceding subframes+1 for the second group, and a shift amount by the number of ECCEs of the last three preceding subframes+1 for the third group) to the groups, when the association set into up to three groups (i.e., a first group of the second subframe to the fourth subframe, a second group of the fifth subframe to the seventh subframe, and a third group of the eighth subframe to the ninth subframe).

Referring back to FIG. 13, the PUCCH resource region for a DL subframe belonging to the third group is shifted to a PUCCH resource region for the last three subframes. More specifically, when the first ARO is applied, the PUCCH resource region for m=8 (the ninth subframe of the association set), the PUCCH resource region may be shifted to the PUCCH resource region of m=5 (the sixth subframe of the association set), as maximum (wherein the "maximum" suggests that there may be a case in which the PUCCH resource region is not shifted to the PUCCH resource region of m=5 depending upon the number of ECCEs included in a DL subframe even when the ARO is applied). That is, as a first ARO value is used, a different shift/compression of a PUCCH resource may be implemented for each group as indicated by arrows in FIG. 13.

In summary, when ACK/NACK related to two or more subframes needs to be transmitted in a UL subframe (M>1), an ARO set according to Embodiment 1 may include the first ARO value $$-\sum_{i=m-\lceil m/3\rceil}^{m-1} N_{eCCE,i,j} - 1,$$

and thus be $$\left\{-\sum_{i=0}^{m-1} N_{eCCE,i,j} - 2, -\sum_{i=m-\lceil m/3\rceil}^{m-1} N_{eCCE,i,j} - 1, 0, 2\right\}.$$

If ACK/NACK related to one subframe needs to be transmitted in a UL subframe (M=1), the ARO set is {−2, −1, 0, 2}.

Embodiment 2

ARO sets according to Embodiment 2 may be given by Equation 4 below.

$$\{-2, -1, 0, 2\}, m = 0 \quad \text{Equation 4}$$

$$\left\{-\sum_{i=0}^{m-1} N_{eCCE,i,j} - x, -N_{eCCE,m-1,j} - y, 0, 2\right\}, 1 \leq m \leq a$$

$$\left\{-\sum_{i=1}^{m-1} N_{eCCE,i,j} - x, -N_{eCCE,m-1,j} - y, 0, 2\right\}, a+1 \leq m \leq b$$

$$\left\{-\sum_{i=2}^{m-1} N_{eCCE,i,j} - x, -N_{eCCE,m-1,j} - y, 0, 2\right\}, b < m$$

In Equation 4, a and b have values by which DL subframes in a bundling window are divided into groups. a and b may have predetermined values or values transferred through, for example, higher layer signaling. For example, a=2, b=5, and nine DL subframe may be equally divided by the ratio of 3:3:3. According to Equation 4, PUCCH resources of subframes having m between 1 and a may be shifted to the PUCCH resource region for the first subframe, PUCCH resources of subframes having m between a and b may be shifted to the PUCCH resource region for the second subframe, and PUCCH resources of subframes having m greater than or equal to b+1 may be shifted to the PUCCH resource region for the third subframe. Thereby, unequal distribution/overlapping of the PUCCH resources may be prevented. In Embodiment 2 and other embodiments given below, x, y, z, x', y' and z' are integers much less than $N_{eCCE, i, j}$, and may have predetermined values or signaled values.

Embodiment 3

ARO set according to Embodiment 3 may be given by Equation 5 below.

$$\{-2, -1, 0, 2\}, m = 0 \quad \text{Equation 5}$$

$$\{-N_{eCCE,0,j} - x, -1, 0, 2\}, m = 1$$

$$\left\{-\sum_{i=0}^{m-1} N_{eCCE,i,j} - x', -\sum_{i=1}^{m-1} N_{eCCE,i,j} - y, 0, 2\right\}, 1 < m$$

In Equation 5, the first ARO value is for shift of PUCCH resources to the PUCCH resource region for the first subframe, and the second ARO value is for shift of PUCCH resources to the PUCCH resource region for the second subframe.

Embodiment 4

ARO sets according to Embodiment 4 may be given by Equation 6 below.

$$\{-2, -1, 0, 2\}, m = 0 \quad \text{Equation 6}$$

$$\left\{-\sum_{i=0}^{m-1} N_{eCCE,i,j} - x, -\sum_{i=1}^{m-1} N_{eCCE,i,j} - y, \right.$$

$$\left. -\sum_{i=2}^{m-1} N_{eCCE,i,j} - z, 0\right\}, 1 \leq m$$

The ARO values, $$-\sum_{i=0}^{m-1} N_{eCCE,i,j} - x, -\sum_{i=1}^{m-1} N_{eCCE,i,j} - y, -\sum_{i=2}^{m-1} N_{eCCE,i,j} - z \qquad 5$$

may provide maximum shift amounts of the last subframe, the last two subframes, and the last three subframes to a PUCCH resource region.

Embodiment 5

ARO sets according to Embodiment 5 may be given by Equation 7 below.

$$\{-2, -1, 0, 2\}, m = 0 \qquad \text{Equation 7}$$

$$\left\{-\sum_{i=0}^{m-1} N_{eCCE,i,j} - x, -\sum_{i=1}^{m-1} N_{eCCE,i,j} - y, 0, 2\right\}, 1 \le m \le a$$

$$\left\{-\sum_{i=1}^{m-1} N_{eCCE,i,j} - x, -\sum_{i=2}^{m-1} N_{eCCE,i,j} - y, 0, 2\right\}, a+1 \le m \le b$$

$$\left\{-\sum_{i=2}^{m-1} N_{eCCE,i,j} - x, -\sum_{i=3}^{m-1} N_{eCCE,i,j} - y, 0, 2\right\}, b+1 < m$$

In Equation 7, the subframes in the association set are divided into three groups. Maximum shift amounts are provided to the groups such that the first group is shifted up to the PUCCH resource region for the first and second subframes, the second group is shifted up to the PUCCH resource region for the second and third subframes, and the third group is shifted up to the PUCCH resource region for the third and fourth subframes. While the subframes are illustrated as being divided into three groups in the above example, the subframes may be divided into two groups as necessary. In this case, the ARO set of the last group or the second group of the above embodiment may not be used.

Embodiment 6

ARO sets according to Embodiment 6 may be given by Equation 8 below.

$$\{-2, -1, 0, 2\}, m = 0 \qquad \text{Equation 8}$$

$$\left\{-\sum_{i=0}^{m-1} N_{eCCE,i,j} - x, -N_{eCCE,m-1,j} - y, 0, 2\right\}, 1 \le m \le a$$

$$\left\{-\sum_{i=2}^{m-1} N_{eCCE,i,j} - x, -N_{eCCE,m-1,j} - y, 0, 2\right\}, a < m$$

In Embodiment 6, the subframes in the association set are divided into up to two groups. In the case of the first group, an ARO value to shift the resources to the PUCCH resource region for the first subframe or an ARO to shift the resources to the PUCCH resource region for a previous subframe may be applied. In the case of the second group, an ARO value to shift the resources to the PUCCH resource region for the second subframe or an ARO value to shift the resources to the PUCCH resource region for a previous subframe may be applied.

Embodiment 7

ARO sets according to Embodiment 7 may be given by Equation 9 below.

$$\{-2, -1, 0, 2\}, m = 0 \qquad \text{Equation 9}$$

$$\left\{-\sum_{i=0}^{m-1} N_{eCCE,i,j} - x, -\sum_{i=1}^{m-1} N_{eCCE,i,j} - y, 0, 2\right\}, 1 \le m \le a$$

$$\left\{-\sum_{i=2}^{m-1} N_{eCCE,i,j} - x, -\sum_{i=3}^{m-1} N_{eCCE,i,j} - y, 0, 2\right\}, a < m$$

According to Equation 9, the subframes in the association set are divided into up to two groups, and an ARO value to shift PUCCH resources to the PUCCH resource region for the first and second subframes may be applied to the first group. An ARO value to shift PUCCH resources to the PUCCH resource region for the third and fourth subframes may be applied to the second group.

Embodiment 8

ARO sets according to Embodiment 8 may be given by Equation 10 below.

$$\{-2, -1, 0, 2\}, m = 0 \qquad \text{Equation 10}$$

$$\left\{-\sum_{i=0}^{m-1} N_{eCCE,i,j} - x, -N_{eCCE,m-1,j} - y, 0, 2\right\}, 1 \le m \le a$$

$$\left\{-\sum_{i=m-2}^{m-1} N_{eCCE,i,j} - x, -\sum_{i=m-3}^{m-1} N_{eCCE,i,j} - y, -N_{eCCE,m-1,j} - z, 0\right\}, a < m$$

Embodiment 9

ARO sets according to Embodiment 9 may be given by Equation 11 below.

$$\{-2, -1, 0, 2\}, m = 0 \qquad \text{Equation 11}$$

$$\left\{-\sum_{i=m-2}^{m-1} N_{eCCE,i,j} - x, -N_{eCCE,m-1,j} - y, 0, 2\right\}, 1 \le m \le a$$

$$\left\{-\sum_{i=m-2}^{m-1} N_{eCCE,i,j} - x, -\sum_{i=m-3}^{m-1} N_{eCCE,i,j} - y, 0, 2\right\},$$

$$a+1 \le m \le b$$

$$\left\{-\sum_{i=m-3}^{m-1} N_{eCCE,i,j} - x, -\sum_{i=m-4}^{m-1} N_{eCCE,i,j} - y, 0, 2\right\}, b+1 < m$$

Embodiment 10

ARO sets according to Embodiment 10 may be given by Equation 12 below.

$$\{-2, -1, 0, 2\}, m = 0 \qquad \text{Equation 12}$$

$$\{-N_{eCCE,m-1,j} - x, -1, 0, 2\}, 1 \le m \le a$$

$$\left\{-\sum_{i=m-1}^{m-2} N_{eCCE,i,j} - x', -N_{eCCE,m-1,j} - y, 0, 2\right\},$$

-continued $$\left\{-\sum_{i=m-3}^{m-1} N_{eCCE,i,j} - z, -\sum_{i=m-2}^{m-1} N_{eCCE,i,j} - x'',\right.$$

$$a+1 \le m \le b$$

$$\left. -N_{eCCE,m-1,j} - y', 0\right\}, b+1 < m$$

Embodiment 11

ARO sets according to Embodiment 11 may be given by Equation 13 below.

$$\{-2, -1, 0, 2\}, m = 0 \qquad \text{Equation 13}$$

$$\left\{-\sum_{i=m-1}^{m-2} N_{eCCE,i,j} - x', -N_{eCCE,m-1,j} - y, 0, 2\right\}, 1 \le m \le a$$

-continued $$\left\{-\sum_{i=m-2}^{m-1} N_{eCCE,i,j} - x, -\sum_{i=m-3}^{m-1} N_{eCCE,i,j} - y, 0, 2\right\},$$

$$a+1 \le m \le b$$

$$\left\{-\sum_{i=m-3}^{m-1} N_{eCCE,i,j} - z, -\sum_{i=m-2}^{m-1} N_{eCCE,i,j} - x'',\right.$$

$$\left. -N_{eCCE,m-1,j} - y', 0\right\}, b+1 < m$$

Embodiment 12

ARO sets according to Embodiment 12 may be given by Equation 14 below.

$$\{-2, -1, 0, 2\}, m = 0 \qquad \text{Equation 14}$$

$$\left\{-\sum_{i=0}^{m-1} N_{eCCE,i,j} - 2, -N_{eCCE,m-1,j} - 1, 0, 2\right\}, 1 \le m \le 3$$

$$\left\{-\sum_{i=0}^{m-1} N_{eCCE,i,j} - 2, -\sum_{i=m-\lfloor m/2 \rfloor}^{m-1} N_{eCCE,i,j} - 1, 0, 2\right\}, 3 < m$$

In Embodiment 12, the subframes in the association set are divided into up to two groups, and ARO having an offset value which is variable depending on the value of m may be used for the second group.

Embodiment 13

The subframes in the association set may be divided into some groups and an ARO set applied to the respective groups may be set such that the large offset values are equal to each other, and small offset values of x, y and z are different from each other. For example, if the ARO set is {−X−x, −Y−y, −Z−z, 0} or {−X−x, −Y−y, 0, 2}, only the small offsets of x, y and z may be set to different values.

In conjunction with or independently of the aforementioned embodiments, in the case of UL-DL configuration 5, when PUCCH resources for the subframes transmitting ACK/NACK in subframe #2 are arranged to be adjacent to each other, number 11 may come last in order, unlike the example of Table 6. That is, Table 6 is changed to Table 8. In this case, excessive reservation of PUCCH resources may be suppressed. The subframe corresponding to number 11 is a special subframe since an EPDCCH is not transmitted in that subframe.

TABLE 8

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 6, 11 | — | — | — | — | — | — | — |
| 6 | — | — | 7 | 7 | 5 | — | — | 7 | 7 | — |

Configurations Of Devices For Embodiments Of The Present Invention

FIG. 14 is a diagram illustrating configuration of a transmit point apparatus and a UE according to one embodiment of the present invention.

Referring to FIG. 14, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 14, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 14 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

The invention claimed is:

1. A method for transmitting a reception acknowledgement response by a user equipment in a wireless communication system, comprising:
receiving an enhanced physical downlink control channel (EPDCCH); and
transmitting, through a physical uplink control channel (PUCCH) resource, a reception acknowledgement response for one or more downlink subframes,
wherein the PUCCH resource is determined based on a hybrid acknowledgement request-acknowledgement (HARQ-ACK) acknowledgement resource offset (ARO) and a lowest enhanced control channel element (ECCE) index,
wherein, when the reception acknowledgement response is related to two or more of the one or more downlink subframes and is to be transmitted in a single subframe, a set of possible values for the HARQ-ACK ARO comprises a first ARO value which shifts a PUCCH resource of a second or later subframe of the two or more downlink subframes to a PUCCH resource corresponding to downlink subframe that is located at least one downlink subframe prior to the second or later subframe, and
wherein the first ARO value shifts the PUCCH resource depending on which downlink subframe group the second or later subframe belongs to among downlink subframe groups.

2. The method according to claim 1, wherein, when the two or more downlink subframes comprise up to nine downlink subframes, the downlink groups comprise a first downlink group comprising a second downlink subframe to a fourth downlink subframe, a second downlink group comprising a fifth downlink subframe to a seventh downlink subframe, and a third downlink group comprising an eighth downlink subframe and a ninth downlink subframe.

3. The method according to claim 2, wherein the first ARO value provides a shift amount of the number of ECCEs of a last preceding subframe+1 for a downlink subframe corresponding to the first downlink group, a shift amount of the number of ECCEs of last two preceding subframes+1 for a downlink subframe corresponding to the second downlink group, and a shift amount of the number of ECCEs of last three preceding subframes+1 for a downlink subframe corresponding to the third downlink group.

4. The method according to claim 1, wherein the first ARO value is $$-\sum_{i=m-\lceil m/3 \rceil}^{m-1} N_{eCCE,i,j} - 1,$$

wherein m is an index of two or more subframes, and $N_{eCCE, i, j}$ is the number of ECCEs of an i-th subframe in EPDCCH-PRB-set j.

5. The method according to claim 1, wherein the set of possible values for the ARO is $$\left\{ -\sum_{i=0}^{m-1} N_{eCCE,i,j} - 2, -\sum_{i=m-\lceil m/3 \rceil}^{m-1} N_{eCCE,i,j} - 1, 0, 2 \right\}.$$

6. The method according to claim 1, wherein, the reception acknowledgement response is related to only one downlink subframes and is to be transmitted in a the one subframe, the set of possible values for the ARO is {−2, −1, 0, 2}.

7. The method according to claim 1, wherein the ARO is indicated by downlink control information (DCI), the DCI being transmitted over the EPDCCH.

8. A user equipment (UE) apparatus for transmitting a reception acknowledgement response in a wireless communication system, comprising:
 a transceiver; and
 a processor,
 wherein the processor is configured to
 receive an enhanced physical downlink control channel (EPDCCH); and
 transmit, through a physical uplink control channel (PUCCH) resource, a reception acknowledgement response for one or more downlink subframes,
 wherein the PUCCH resource is determined based on a hybrid acknowledgement request-acknowledgement (HARQ-ACK) acknowledgement resource offset (ARO) and a lowest enhanced control channel element (ECCE) index,
 wherein, when the reception acknowledgement response is related to two or more of the one or more downlink subframes and is to be transmitted in a single subframe, a set of possible values for the HARQ-ACK ARO comprises a first ARO value which shifts a PUCCH resource of a second or later subframe of the two or more downlink subframes to a PUCCH resource corresponding to downlink subframe that is located at least one downlink subframe prior to the second or later subframe, and
 wherein the first ARO value shifts the PUCCH resource depending on which downlink subframe group the second or later subframe belongs to among downlink subframe groups.

\* \* \* \* \*